United States Patent [19]

Max

[11] 4,450,720
[45] May 29, 1984

[54] FLOWMETER CONNECTING ROD ASSEMBLY

[76] Inventor: John K. Max, 1420 Healdsburg Ave., Healdsburg, Calif. 95448

[21] Appl. No.: 410,204

[22] Filed: Aug. 23, 1982

[51] Int. Cl.³ .............................................. G01F 3/18
[52] U.S. Cl. .............................................. 73/247
[58] Field of Search ...................... 73/247; 92/72, 148, 92/187; 417/273

[56] References Cited

U.S. PATENT DOCUMENTS

| | | | |
|---|---|---|---|
| 973,739 | 10/1910 | Alvergnat | 417/273 |
| 1,654,893 | 1/1928 | Meyers et al. | 417/273 |
| 2,106,651 | 1/1938 | Parker et al. | 73/247 |
| 2,108,532 | 2/1938 | Frelin | 92/187 |
| 2,572,711 | 10/1951 | Fischer | 417/273 X |
| 2,703,264 | 3/1955 | Pitner | 92/187 |
| 3,340,856 | 9/1967 | Brown | 92/187 X |
| 3,757,581 | 9/1973 | Mankin et al. | 73/247 |

Primary Examiner—Herbert Goldstein
Attorney, Agent, or Firm—Townsend and Townsend

[57] ABSTRACT

A flowmeter connecting rod assembly for use with a positive displacement radial piston flowmeter. The flowmeter includes pistons mounted radially about the central axis of an indicator shaft. The indicator shaft has an eccentric crank pin extending from its lower end parallel to the central axis. Each piston has a wrist pin for connection to the crank pin by a connecting rod. The ends of the connecting rod have enlarged holes sized for mounting ball bearings therein. The connecting rod is connected to the crank pin and the wrist pin by the bearings. The wrist pin ball bearing is secured to the connecting rod by a rivet assembly which clamps onto its outer race. The crank pin ends of the connecting rods are positioned along the axis of the crank pin by spacers and are kept in place by a spring clip.

9 Claims, 6 Drawing Figures

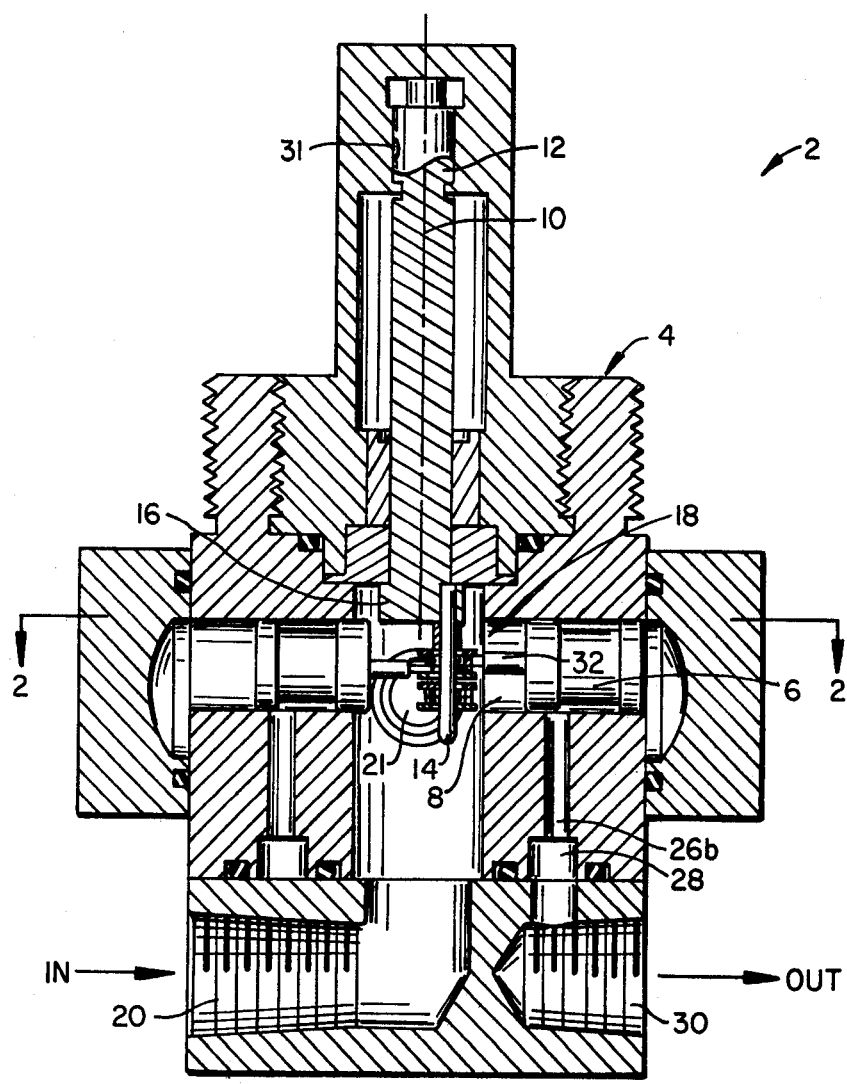
FIG._1.

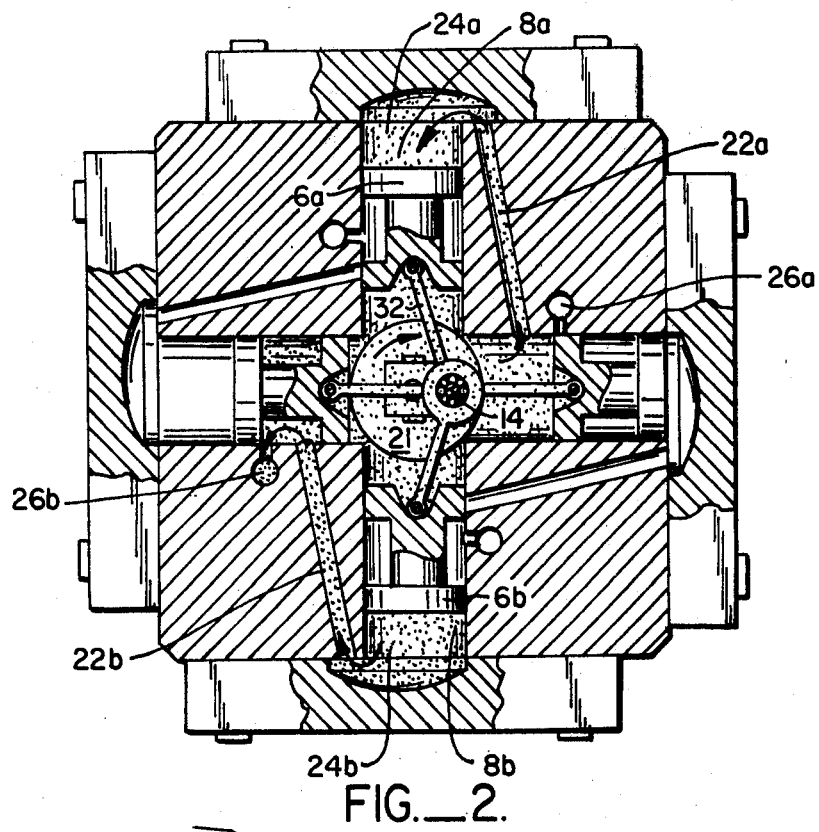
FIG.__2.
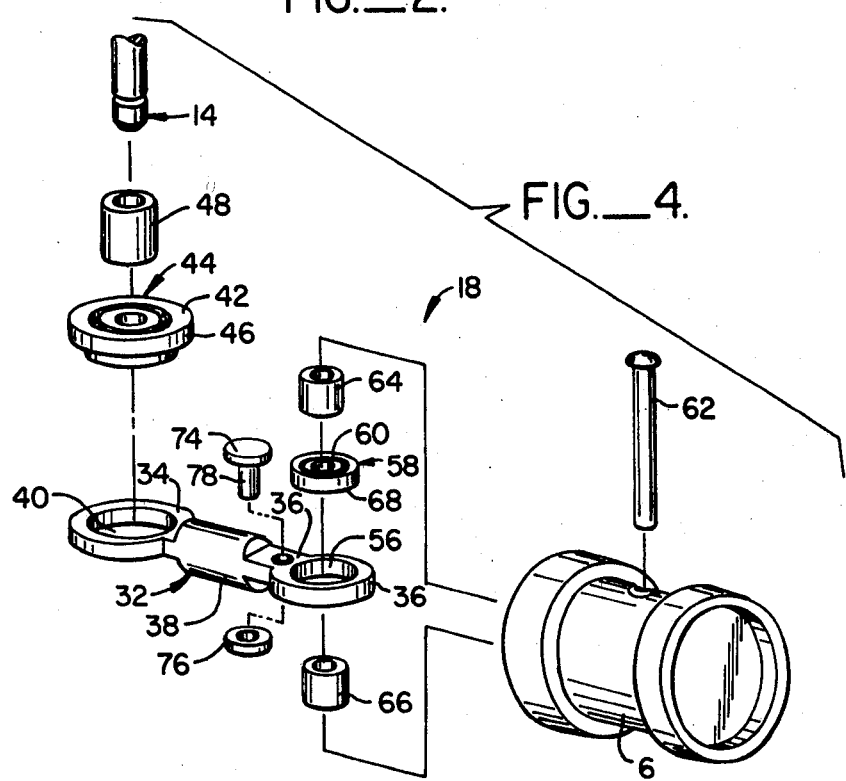
FIG.__4.

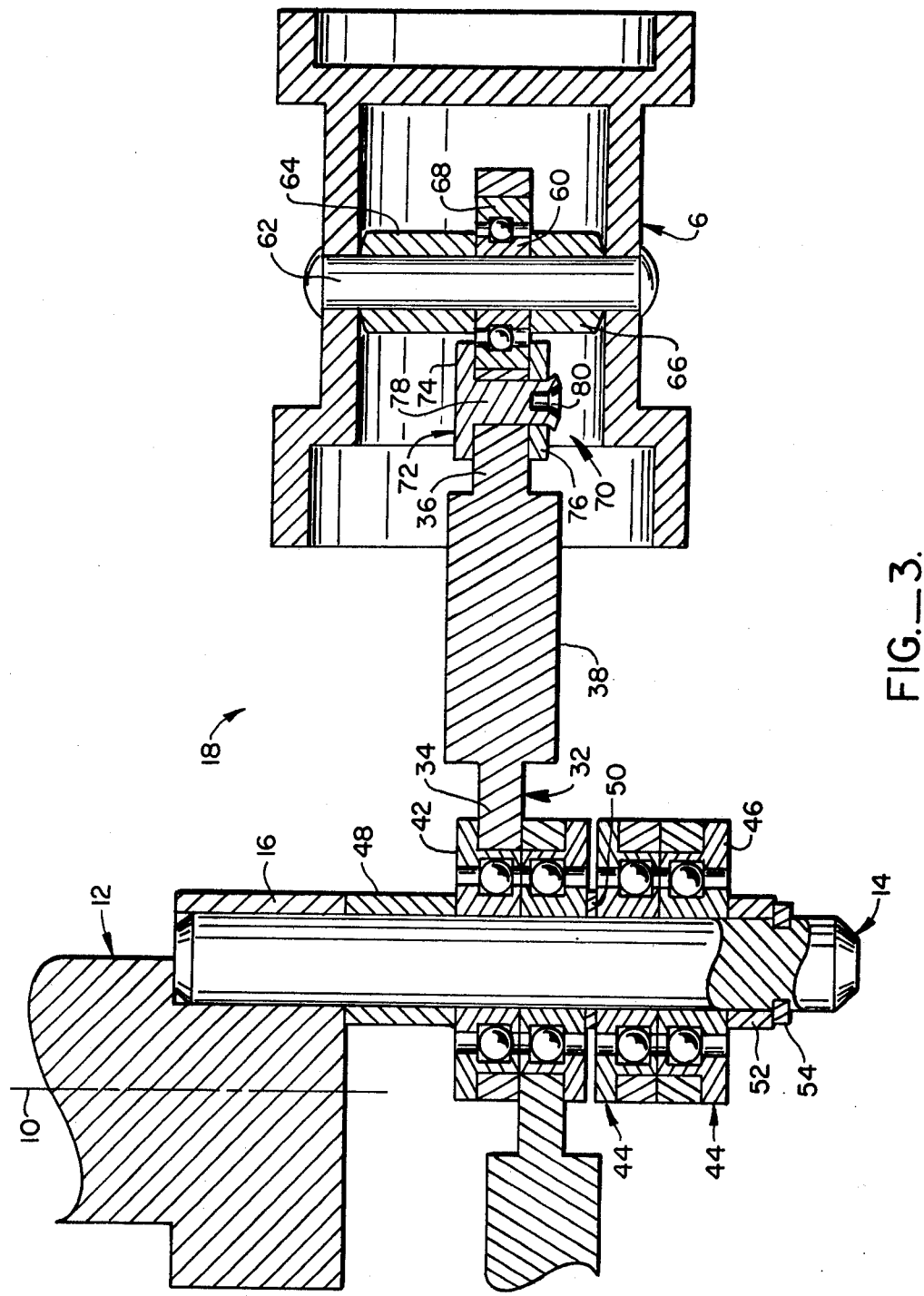
FIG._3.

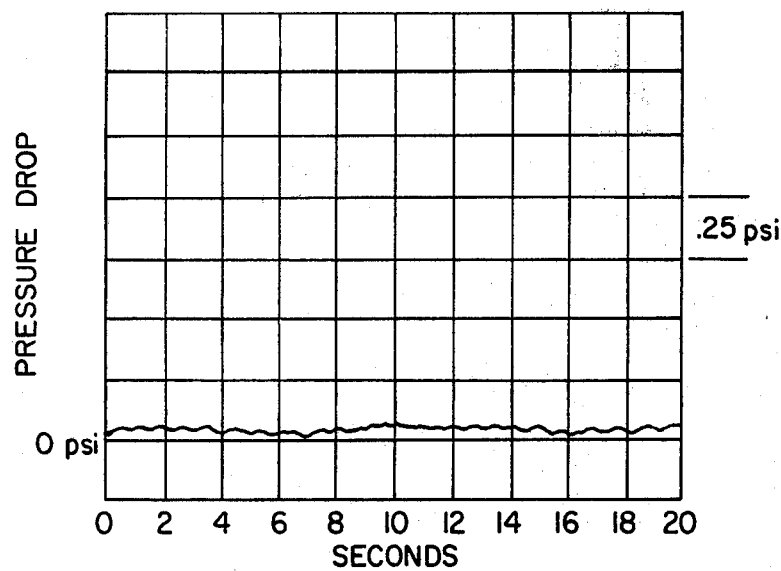
FIG._5A.
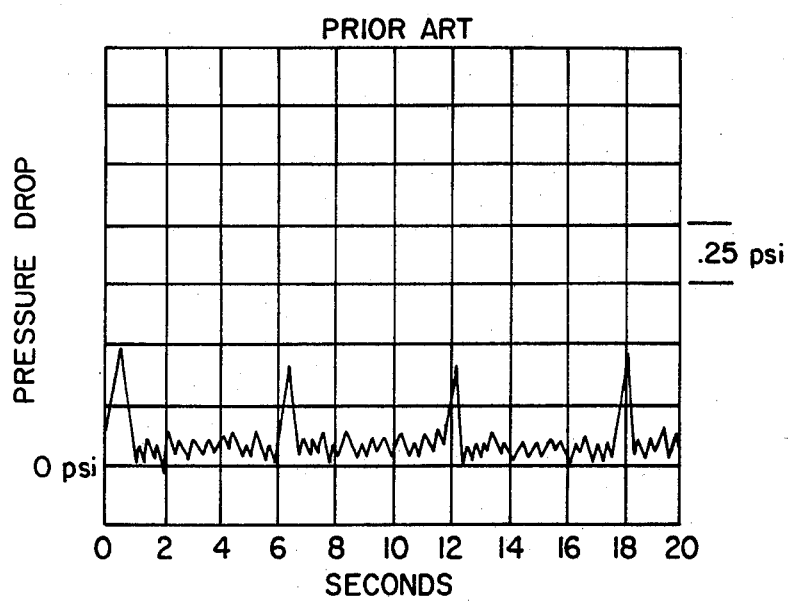
FIG._5B.

FLOWMETER CONNECTING ROD ASSEMBLY

DESCRIPTION

Background of the Invention

This invention is related to radial piston flowmeters, particularly an improved connecting rod assembly for radial piston flow meters.

Devices for metering fluids can be characterized as either direct or indirect instruments. The most common type of direct metering devices are positive displacement meters such as rotary vane flowmeters or radial piston flowmeters. Indirect metering device estimate the flow rate by such techniques as measuring the pressure drop past an obstruction, measuring the drag on an object placed in the flow path, measuring the speed at which fluid rotates a turbine and so forth. All flowmeters, be they used in industry or for scientific purposes, have two primary desirable characteristics: accuracy and minimum interruption of the flow.

One type of positive displacement flowmeter uses a number of radially oriented pistons about a central axis. Radial piston flowmeters are commercially available from Max Machinery, Inc. of Healdsburg, Calif. Standard radial piston flowmeters work well but during the metering cycle there usually appear periodic pressure fluctuations at the output port of the meter. The pressure fluctuations are undesirable since they lower the accuracy and reduce the smoothness of operation of the flowmeter.

One source of the periodic pressure fluctuations have been found to be caused by erratic movements of one or more of the pistons during a portion of its cycle. One or more of the piston and crank assemblies appear to get hung up and momentarily stick during its cycle. Applicant has determined that this sticking or hanging up is caused in large part by the construction of the connecting rod assembly.

In the prior art designs the crank shaft end of the connecting rod is not fixed in place but is allowed to walk back and forth along the axis of the crank pin. Thus the connecting rod can slide around and get into positions during the operation of the meter which require a significant force to return it to a more neutral position. This results in a momentary and highly unpredictable pressure fluctuation at the input port of the meter. In addition, to achieve the correct alignment of the bores of the connecting rod and the wrist pin, and thus minimize binding, a large amount of empirical experience is required of the worker to satisfactorily assembly a meter. Even then, in critical applications, the resulting operation of the meter is often unpredictable.

The binding or sticking also results in accelerated wear on the components of the connecting rod assembly. The lubricant between the piston and cylinder walls also can be squeezed out during the momentary binding. This can increase friction and wear between the piston and cylinder to degrade the performance of the meter. The fluctuating pressure produces a general degradation of meter accuracy.

SUMMARY OF THE INVENTION

The invention is an improved flowmeter connecting rod assembly for use with a positive displacement radial piston flowmeter. The flowmeter includes a number of pistons mounted in cylinders arranged radially about the central axis of an indicator shaft. The indicator shaft has an eccentric crank pin extending from its lower end. The axis of the crank pin is parallel to the central axis. The ends of the cylinders closet the central axis are fluidly coupled to a common space surrounding the crank pin. The common space is fluidly connected to an input port. Passageways fluidly couple the outer ends of each cylinder to an intermediate portion of an adjacent cylinder. Exit passageways also connect intermediate portions of the cylinders to an outlet port.

Each of the pistons is connected to the crank pin by a connecting rod. The end of the connecting rod closest the crank pin has a flattened ring shape configured to house a ball bearing. The inside diameter of the inner race of the ball bearings is sized for mating engagement with the crank pin. The outer end of the connecting rod is connected to a wrist pin mounted through the piston. The outer end of the crank pin likewise has a flattened ring shape with flat upper and lower surfaces sized for receipt of a wrist pin ball bearing.

The wrist pin ball bearing is secured to the outer end of the connecting rod by a rivet assembly. The rivet assembly clamps the outer race of the wrist pin ball bearing to the connecting rod. Spacers are used to properly position the wrist pin ball bearing along the wrist pin. The inner ends of the connecting rods and their associated crank pin bearings are positioned along the axis of the crank pin using spacers and are held in place with a spring clip at the lower end of the crank pin.

A primary feature of the present invention is the use of spacers and a retaining clip on the crank pin to restrain the axial movement of the inner ends of the connecting rods along the crank pin. This helps reduce the pressure fluctuations resulting from the inner end of a connecting rod walking along the crank pin.

Another significant feature of the invention, which also enhances its smooth and accurate performance, is its use of ball bearings, instead of bushings or similar bearings, to connect the outer ends of the connecting rods to the wrist pins. Ball bearings limit the radial play, i.e., movement perpendicular to the axis of the wrist pin, of the connecting rods, for enhanced accuracy, but permit some axial and angular movement of the connecting rod without binding or hanging up. This is important because of the necessary manufacturing tolerances inherent in any practical device. Because of slight misalignments the connecting rod will not follow a strictly linear path. For example, the true path of the axis of the connecting rod may trace something approximating a cone rather than a straight line. Recognition of these inevitable slight misalignments and inaccuracies, the present invention permits some axial play of the outer end of the connecting rods along the wrist pin through the ball bearing connection between the connecting rod and the wrist pin. Thus, sticking and hanging up, which would reduce the effectiveness of the meter, is reduced without sacrificing the accuracy of the meter.

Thus, the spacing and securing of the inner ends of the connecting rod along the crank pin, combined with the use of a ball bearing connection between the outer end of the connecting rod and the wrist pin, greatly improves the meter performance by reducing the maximum pressure fluctuations.

Another important feature of the invention is the provision of the rivet and washer for clamping the wrist pin ball bearing to the outer end of the connecting rod. This provides a simple but effective means for mounting the bearing to the connecting rod.

Other features and advantages of the invention will appear from the following description in which the preferred embodiment has been set forth in detail in conjunction with the accompanying drawings.

BRIEF DESCRIPTION OF THE DRAWINGS

FIG. 1 is an axial cross-sectional view of a radial piston flow meter incorporating the connecting rod assembly of the present invention.

FIG. 2 is a radial cross-sectional view of the flow meter of FIG. 1 taken along line 2—2.

FIG. 3 is an enlarged view of a portion of FIG. 1 detailed the connecting rod assembly.

FIG. 4 is an exploded isometric view showing the connecting rod assembly of FIG. 3.

FIG. 5A and 5B illustrate the respective fluctuation in the pressure drop between the input and output ports of the flow meter of FIG. 1 and of a similar prior art flowmeter.

DETAILED DESCRIPTION OF THE PREFERRED EMBODIMENT

Turning now to FIG. 1, flowmeter 2 includes broadly a casing 4 housing a number of pistons 6 within cylinders 8. The pistons and cylinders are arranged radially about a central axis 10. Central axis 10 will be considered a vertical axis for the purpose of this application. However it should be understood that flowmeter 2 may be used in other orientations as well.

An indicator shaft 12 is mounted within casing 4 for rotation about central axis 10. A crank pin 14 is mounted to and extends from a lower end 16 of indicator shaft 12 spaced apart from and parallel to central axis 10. Pistons 6 are each connected to crank pin 14 by a connecting rod assembly 18. Assembly 18 incorporates the novel aspect of this invention and is described below.

Referring now also to FIG. 2, the operation of flowmeter 2 will be described briefly. Pressurized fluid is applied to input port 20 where it flows into a common space 21 surrounding crank pin 14. The innermost ends of cylinders 8 open into space 21. Casing 4 includes a number of passageways 22 which connect the outer ends 24 of cylinders 8 to an intermediate portion of an adjacent cylinder. Regardless of the position of crank pin 14, high pressure fluid from input port 20 and space 21 is allowed to pass through one of the passageways 22 to press against the face of a piston 6.

In FIG. 2 fluid from space 21 passes through passageway 22a, into outer end 24a of cylinder 8a to press against the outer face of piston 6a. This causes crank pin 14 to rotate in a clockwise direction forcing fluid out of outer end 24b of cylinder 8b by the movement of piston 8b. This forces fluid through passagway 22b and out exit passageway 26b. The exit passageways are connected by an exit channel 28 which is fluidly coupled to an outlet port 30.

Rotation of crank pin 14, caused by the flow of fluid through flowmeter 2, rotates indicator shaft 12 about central axis 10. This rotation is indicated by mounting one or more magnets 31 within shaft 12. The rotation of the magnet on the shaft can be monitored in a conventional manner.

The above-described flowmeter is generally convention in structure and operation.

Turning now also to FIGS. 3 and 4, connecting rod assembly 18 includes a connecting rod 32 having an inner end 34 adjacent central axis 10 and an outer end 36 mounted within piston 6. The inner and outer ends 34, 36 of rod 32 have flat upper and lower surfaces while an intermediate portion 38 is cylindrical. Inner end 34 has a ring-like shape with a circular opening 40 sized for mating engagement with the outer race 42 of a crank pin bearing 44. Outer race 42 includes shoulder 46 which rests against either an upper or a lower surface of the inner end 34 of its associated connecting rod 32.

The axial spacing of bearings 44 along crank pin 14 is provided by an upper spacer 48, an intermediate spacer 50 and a lower spacer 52. The spacers, and thus bearings 44 and the inner ends 44 of the connecting rods, are maintained in their proper axial positions by a snap-ring 54. Other spacers may be used if needed to achieve the proper axial spacing. It is important that whatever the proper axial position of the bearings and connecting rod is, that it be maintained by restricting the axial movement of bearings 44, such as through the use of spacers 48—52 and snap-ring 54.

Outer end 36 is also in the shape of a flattened ring having a circular opening 56 within which a wrist pin ball bearing 58 is mounted. The inner circumference of the inner race 60 of bearing 58 is sized for complementary engagement with a wrist pin 62. Wrist pin 62 is mounted to a central portion of piston 6 in a direction generally parallel to central axis 10. A pair of spacers 64, 66 position inner race 60 of bearing 58 along wrist pin 62. The outer race 68 of wrist bearing 58 is secured to outer end 36 of connecting rod 32 by a rivet assembly 70. Assembly 70 includes a rivet 72 having a head 74, a body member 78 and a washer 76. An opening 80 is formed in the end of body member 78 to allow the end to be flared, as in FIG. 3, to secure washer 76 onto the body member. The thickness of outer end 36, that is the dimension parallel to central axis 10, is about equal to the height of outer race 68 permitting rivet assembly to securely clamp outer race 68 between rivet head 74 and washer 76.

FIG. 5A illustrates an exemplary plot of the pressure drop across a flowmeter 2 incorporating the novel connecting rod assembly 18 of the invention. The graph plots pressure drop versus time at a flow of 10 cc per minute. FIG. 5B represents a graph of a typical pressure drop across a prior art flow meter. As is clearly shown by the two graphs, the pressure fluctuation with a flow meter made according to the present invention is substantially less than the pressure fluctuations produced with typical prior art flowmeters. This is primarily the result of two features of connecting rod assembly 18. First, upper spacer 48, intermediate spacer 50 and lower spacer 52 are sized to accurately and correctly position the inner ends 34 of connecting rods 32 along crank pin 14. Snap-ring 54 ensures that this spacing is maintained to eliminate movement along crank pin 14, as occurs with many prior art flowmeters. Second, both wrist bearing 58 and crank pin bearings 44 minimize radial play between crank pin 14 and wrist pin 62. However, wrist bearing 58 allows a small but sufficient amount of axial play between inner race 60 and outer race 68 without binding. Thus, a slight misalignment, which usually exits, can be accommodated without causing binding to minimize pressure fluctuations.

The best mode contemplated for carrying out the present invention has been shown and described. However, modification and variation can be made to the disclosed embodiment without departing from the subject of the invention as defined in the following claims.

I claim:

1. A flowmeter connecting rod assembly for use with a radial piston flowmeter of the type including a plurality of cylinders and pistons arranged radially about a crank axis and an eccentric axial crank pin, a wrist pin mounted within the piston along an axis generally parallel to the crank axis, the pistons each having the connecting rod assembly comprising:

a connecting rod having a crank end and a piston end;
   a wrist pin ball bearing having inner and outer races and mounted about the wrist pin;
   a crank pin bearing mounted about the crank pin ;
   said crank and piston ends of said rod having means for mounting said crank pin and wrist pin ball bearings thereto;
   means for axially spacing said wrist pin ball bearing along said wrist pin; and
   means for securing said wrist pin ball bearing to said rod.

2. The connecting rod assembly of claim 1 wherein said crank pin bearing is a ball bearing.

3. The connecting rod assembly of claim 1 wherein said axial spacing means are tubular spacers sized to engage the inner race of the wrist pin ball bearing.

4. The connecting rod assembly of claim 1 wherein said securing means includes rivet means for clamping the outer race of said wrist pin ball bearing to the piston end of the connecting rod.

5. The connecting rod assembly of claim 4 wherein said connecting rod has a through hole parallel to the crank axis and sized for passage of a central portion of said rivet means therethrough.

6. A radial piston flowmeter comprising:
   a housing including a fluid inlet and a fluid outlet;
   a plurality of cylinders formed in said housing arranged in radial direction from a crank axis;
   passageways fluidly coupling said cylinders to said fluid inlet and said fluid outlet;
   an indicator shaft mounted to said housing for concentric rotation about said crank axis, said crank including an eccentric crank pin attached to said indicator shaft offset from and parallel with said crank axis;
   a piston mounted for movement within each one of said cylinders, each said piston having a wrist pin mounted generally parallel to said crank axis;
   means for coupling each of said pistons to said crank pin, said coupling means comprising:
   a connecting rod having a crank pin ball bearing mounted to a crank pin end thereof and through which the crank pin passes, and a wrist pin ball bearing mounted to a wrist pin end thereof and through which the wrist pin passes;
   means for clamping the wrist pin ball bearing to the connecting rod; and
   spacer means for positioning the wrist pin ball bearing along the wrist pin; and
   means for restrictively positioning said crank pin ball bearings along said crank pin.

7. A radial piston flowmeter comprising:
   a housing including a fluid inlet and a fluid outlet;
   a plurality of cylinders formed in said housing arranged in radial direction from a crank axis;
   passageways fluidly coupling said cylinders to said fluid inlet and said fluid outlet;
   an indicator shaft mounted to said housing for concentric rotation about said crank axis, said crank including an eccentric crank pin attached to said indicator shaft offset from and parallel with said crank axis;
   a piston mounted for movement within each one of said cylinders, each said piston having a wrist pin mounted generally parallel to said crank axis;
   means for coupling each of said pistons to said crank pin, said coupling means comprising:
   a connecting rod having a crank pin end, a wrist pin end and a hole generally parallel to said crank axis;
   a crank pin bearing mounted to the crank pin end of said connecting rod and through which the crank pin passes;
   a wrist pin ball bearing having inner and outer races and being mounted to the wrist pin end of said connecting rod, said wrist pin passing through the inner race;
   means for clamping the wrist pin ball bearing to the connecting rod including a fastening assembly having an enlarged head, a stem portion sized for passing through said hole, an enlarged keeper and means for securing said keeper onto said stem, said hole positioned and said head and keeper sized so said head and keeper secure the outer race of said wrist bearing therebetween;
   spacer means for positioning the wrist pin bearing along the wrist pin; and
   means for restrictively positioning said crank pin bearings along said crank pin.

8. The flowmeter of claim 7 wherein said crank pin bearing is a ball bearing.

9. The flowmeter of claim 7 wherein said wrist pin end of said connecting rod has parallel upper and lower surfaces lying perpendicular to the axis of said hole, the thickness of said wrist pin end between the upper and lower surfaces approximating the axial dimension of the outer race of said wrist pin bearing.

* * * * *